US008576795B2

(12) United States Patent
Ulupinar et al.

(10) Patent No.: US 8,576,795 B2
(45) Date of Patent: Nov. 5, 2013

(54) METHOD AND APPARATUS FOR HANDOFF BETWEEN SOURCE AND TARGET ACCESS SYSTEMS

(75) Inventors: Fatih Ulupinar, San Diego, CA (US); Peerapol Tinnakornsrisuphap, San Diego, CA (US); Parag Arun Agashe, San Diego, CA (US); Ravindra Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 12/143,044

(22) Filed: Jun. 20, 2008

(65) Prior Publication Data

US 2008/0318575 A1     Dec. 25, 2008

Related U.S. Application Data

(63) Continuation-in-part of application No. 12/047,234, filed on Mar. 12, 2008, now Pat. No. 8,289,920.

(60) Provisional application No. 60/950,583, filed on Jul. 18, 2007, provisional application No. 60/895,365, filed on Mar. 16, 2007.

(51) Int. Cl.
*H04W 4/00* (2009.01)
*H04W 36/00* (2009.01)

(52) U.S. Cl.
USPC .......................................... 370/331; 455/437

(58) Field of Classification Search
None
See application file for complete search history.

(56) References Cited

U.S. PATENT DOCUMENTS

| 7,046,647 | B2 | 5/2006 | Oba et al. |
| 7,978,683 | B2 | 7/2011 | Balogh et al. |
| 2002/0136226 | A1* | 9/2002 | Christoffel et al. ........... 370/401 |
| 2002/0194385 | A1 | 12/2002 | Linder et al. |
| 2003/0104814 | A1 | 6/2003 | Gwon et al. |
| 2003/0125027 | A1 | 7/2003 | Gwon et al. |
| 2004/0008632 | A1 | 1/2004 | Hsu et al. |

(Continued)

FOREIGN PATENT DOCUMENTS

| CN | 1505413 A | 6/2004 |
| CN | 1756237 A | 4/2006 |

(Continued)

OTHER PUBLICATIONS

3GPP2: "UMB and HRPD/Ix Interworking, X.S0054-610-0 Version 1.0" 3GPP2, [Online] Aug. 29, 2008, pp. 1-60, XP002529917 Retrieved from the Internet: URL:http://www.3gpp2.org/Public_html/specs /X.S0054-610-0_v1.0_080909.pdf> paragraphs [003.]-[5.1.3.].
Dutta, A. et al.: Columbia Univ: "A Framework of Media-Independent Pre-Authentication (MPA); draft-ohba-mobopts-mpa-framework-OO.txt" IETF Standard-Working-Draft, Internet Engineering Task Force, IETF, CH, Feb. 13, 2005, pp. 1-39, XP015039521 ISSN: 0000-0004 paragraphs [4.1.]-[4.3.] paragraph [5.4.].

(Continued)

*Primary Examiner* — Chirag Shah
*Assistant Examiner* — Ashley Shivers

(57) ABSTRACT

Systems and methods for switching among heterogeneous networks and inter-working between a source access system and a target access system. An inter-system handoff control component can facilitate setting an IP tunneling by the mobile unit, wherein IP addresses for inter-working security gateway and Radio Access Network of the target access system can be identified. The inter-system handoff control component can then implement tunneling between the source system and the target system, wherein signaling/packeting associated with the target system can be transferred over the source system.

48 Claims, 10 Drawing Sheets

(56) References Cited

U.S. PATENT DOCUMENTS

| | | |
|---|---|---|
| 2004/0125795 A1 | 7/2004 | Corson et al. |
| 2004/0203787 A1 | 10/2004 | Naghian |
| 2005/0143072 A1 | 6/2005 | Yoon et al. |
| 2005/0272432 A1 | 12/2005 | Ji et al. |
| 2006/0018280 A1 | 1/2006 | Kumar et al. |
| 2006/0045049 A1 | 3/2006 | Chung et al. |
| 2006/0046728 A1 | 3/2006 | Jung et al. |
| 2006/0072512 A1 | 4/2006 | Das et al. |
| 2006/0099949 A1 | 5/2006 | Jung et al. |
| 2006/0114871 A1* | 6/2006 | Buckley et al. ............... 370/338 |
| 2006/0126565 A1* | 6/2006 | Shaheen ....................... 370/331 |
| 2006/0140150 A1* | 6/2006 | Olvera-Hernandez et al. .............................. 370/331 |
| 2006/0203774 A1 | 9/2006 | Carrion-Rodrigo |
| 2007/0036109 A1 | 2/2007 | Kwak et al. |
| 2007/0160049 A1* | 7/2007 | Xie et al. ....................... 370/390 |
| 2007/0165574 A1 | 7/2007 | Srey et al. |
| 2007/0177585 A1* | 8/2007 | El Mghazli et al. .......... 370/352 |
| 2007/0249352 A1 | 10/2007 | Song et al. |
| 2007/0254625 A1 | 11/2007 | Edge |
| 2007/0258399 A1 | 11/2007 | Chen |
| 2008/0089272 A1* | 4/2008 | Ahokangas .................... 370/328 |
| 2008/0089287 A1* | 4/2008 | Sagfors et al. ................. 370/331 |
| 2008/0092224 A1* | 4/2008 | Coulas et al. ..................... 726/12 |
| 2008/0165740 A1* | 7/2008 | Bachmann et al. ........... 370/332 |
| 2008/0259869 A1 | 10/2008 | Wang et al. |
| 2008/0281978 A1 | 11/2008 | Tang et al. |
| 2008/0305796 A1 | 12/2008 | Dolan |
| 2009/0016300 A1 | 1/2009 | Ahmavaara et al. |
| 2009/0040981 A1 | 2/2009 | Agashe et al. |
| 2009/0111468 A1 | 4/2009 | Burgess et al. |
| 2009/0176489 A1 | 7/2009 | Ulupinar et al. |
| 2009/0201878 A1 | 8/2009 | Kotecha et al. |
| 2009/0202966 A1 | 8/2009 | Teicher et al. |
| 2009/0258631 A1 | 10/2009 | Forsberg et al. |
| 2009/0271623 A1 | 10/2009 | Forsberg et al. |
| 2009/0286527 A1 | 11/2009 | Cheon et al. |
| 2009/0303966 A1 | 12/2009 | Cherian et al. |
| 2010/0061340 A1 | 3/2010 | Ramle et al. |
| 2010/0190500 A1 | 7/2010 | Choi et al. |
| 2011/0044198 A1 | 2/2011 | Persson et al. |

FOREIGN PATENT DOCUMENTS

| | | | |
|---|---|---|---|
| EP | 1441483 A2 | 7/2004 | |
| EP | 1746856 A1 | 1/2007 | |
| JP | 2008503108 A | 1/2008 | |
| JP | 2008507875 A | 3/2008 | |
| JP | 2008519568 A | 6/2008 | |
| JP | 2010534999 A | 11/2010 | |
| KR | 20060124397 A | 12/2006 | |
| KR | 20070046012 A | 5/2007 | |
| KR | 101042763 B1 | 6/2011 | |
| RU | 2004137498 A | 6/2005 | |
| RU | 2260919 C2 | 9/2005 | |
| RU | 2265282 C2 | 11/2005 | |
| TW | 535450 B | 6/2003 | |
| TW | 200541248 | 12/2005 | |
| TW | M294789 U | 7/2006 | |
| WO | 0031946 A2 | 6/2000 | |
| WO | 03030460 A2 | 4/2003 | |
| WO | WO2005036804 A2 | 4/2005 | |
| WO | WO2006011053 A1 | 2/2006 | |
| WO | WO2006049464 A1 | 5/2006 | |
| WO | WO2006052563 A2 | 5/2006 | |
| WO | WO 2006083039 | 8/2006 | |
| WO | WO2006102650 A1 | 9/2006 | |
| WO | WO 2007007990 A1 | 1/2007 | |
| WO | WO2008115757 | 9/2008 | |
| WO | WO2008157633 | 12/2008 | |
| WO | WO2009002586 A2 | 12/2008 | |
| WO | WO2009012191 A2 | 1/2009 | |
| WO | WO2009037623 A2 | 3/2009 | |
| WO | WO2009154640 A2 | 12/2009 | |

OTHER PUBLICATIONS

International Search Report and the Written Opinion—PCT/US2008/070559 International Search Authority—European Patent Office—Jun. 15, 2009.

ETSI TS 136.300 V8.1.0: "Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8" ETSI Standards, Sophia Antip0lis Cedex, France, Jun. 1, 2007, pp. 1-107, XP014038500 ISSN: 0000-0001 paragraph [8.2.] paragraphs [010.]-[10.2.2.].

pp. 1-107, XP014038500 ISSN:0000-0001 paragraph [8.2.]paragraph [010.]- [10.2.2.].

3GPP TR 23.882 vl .8.0 3GPP System Architecture Evolution: Report on Technical Options and Conclusion (Release 7) 3GPP Technical Specification Group Services and System Aspects, [Online] Feb. 21, 2007, XP002488584 Retrieved from the Inte.

3GPP TS36.300 v0.9.0 Evolved Universal Terrestrial Radio Access (E-UTRA) and Evolved Universal Terrestrial Radio Access Network (E-UTRAN); Overall description; 3GPP Technical Specification Group Radio Access . Network, [Online] Mar. 4, 2007, p. 49.

V. Dorot, Tolkovy Slovar' Sovremennoy Kompyuternoy Leksiki (An Explanatory Dictionary of Modern Computer Terms), St. Petersburg, "BKhV-Peterburg", 2004—L2, p. 394.

3GPP: "Optimized Handover Procedures and Protocols between EUTRAN Access and cdma2000 HRPD Acess—Stage 3 (Release 8)" 3rd Generation Partnerschip Project;Technical Specification Group Core Network and Terminals; 3GPP Evolved Packet Systems, Jun. 6, 2008, pp. 1-21, XP002542969 Retrieved from the Internet: URL:http://www.3gpp.org/ftp/Specs/html-info/29276.htm> [retrieved on Aug. 25, 2009] Chapter 1; p. 7 Chapter 4; p. 8 Chapters 7.3-7.3.3; pp. 10-12 Chapter 7.5.6; p. 17.

"3rd Generation Partnership Project; Technical Specification Group Core Network and Terminals;3GPP System Architecture Evolution ; CT WG1 Aspects(Release 8)" 3GPP Draft; 24801-100, 3rd Generation Partnership Project (3GPP), Mobile Competence Centre ; 650, Route Des Lucioles ; F-06921 Sophia-Antipolis Cedex ; France, vol. CT WG1, no. Zagreb, Croatia; 20080623, May 21, 2008, XP050029410, Chapter 7.3.3.2.1; p. 56 Chapters 9.4.1-9.4.3; pp. 69-70 Chapter 10.4; p. 85 Chapters 10.14.1.1.2-10.14.1.1.3; p. 93.

Ericsson: "PDN GW identification" 3GPP Draft; S2-083275_23. 402_CR0263_PDN_GW Identity_PA2, 3rd Generation Partnership Project (3GPP), Mobile Competence Centre ; 650, Route Des Lucioles ; F-06921 Sophia-Antipolis Cedex ; France, vol. SA WG2, no. Prague; 20080512, Apr. 30, 2008, XP050265506 Chapters 8.3 and 9.5; pp. 24-29.

Jun Wang, "Access Authentication and Authorization in UMB", May 14, 2007, 3rd Generation Partnership Project 2 "3GPP2", pp. 1-3.

Stamoulis A et al.,"Space-Time Block-Coded OFDMA With Linear Precoding for Multirate Services" IEEE Transactions on Signal Processing, 20020101 IEEE Service Center, New York, NY, US, vol. 50,Nr:1,pp. 119-129, Jan. 2002, XP001200909.

Technical Specification Group Services and System Aspects: "Architecture enhancements for non-3GPP accesses TS 23.402 V8.0.0 (Release 8)" 3GPP-Standards, 2500 Wilson Boulevard,Suite 300, Arlington, Virginia 22201 USA, Dec. 2007, XP040278698 Chapter 4.1.2; p. 12 Chapters 4.3.2-4.3.5.2; pp. 22-24 Chapters 6.2.1-6.3; pp. 54-62 Chapters 8-9.3.2; pp. 82-104 Annex C.5; pp. 124-125.

3GPP TSG-RAN WG2, "Generic approach for optimized non-3GPP handover", S2-073606 (Aug. 31, 2007).

3GPP TS 23.402, "3rd Generation Partnership Project; Technical Specification Group Services and System Aspects; Architecture enhancements for non-3GPP accesses (Release 8)", V8.1.1, Mar. 2008, pp. 1-163.

3GPP TS 36.300 V8.0.0 (Mar. 2007); Evolved Universal Terrestrial Radio Access (E-UTRA) and Evolved Universal Terrestrial Radio Access Network (E-UTRAN) (Mar. 31, 2007).

\* cited by examiner

METHOD AND APPARATUS FOR HANDOFF BETWEEN SOURCE AND TARGET ACCESS SYSTEMS

CLAIM OF PRIORITY UNDER 35 U.S.C. §119

This application claims the benefit of U.S. Provisional Patent Application Ser. No. 60/950,583 entitled "UMB TO DO HANDOFF" filed on 18 Jul. 2007, and is a Continuation-In-Part of U.S. patent application Ser. No. 12/047,234 entitled "METHOD AND APPARATUS FOR HANDOFF BETWEEN ACCESS SYSTEMS" filed on 12 Mar. 2008, which further claims the benefit of U.S. Provisional Patent Application Ser. No. 60/895,365 entitled "INTERTECHNOLOGIES INTERWORKING" filed on 16 Mar. 2007, all assigned to the assignee hereof, and hereby expressly incorporated by reference herein.

BACKGROUND

1. Field

The following description relates generally to wireless communications, and more particularly to methods and apparatus for session handoff procedures in heterogeneous networks.

2. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

In particular, as the evolution of wireless technologies continues to advance, the progression of mobile services will continue to evolve into ever-richer, more compelling mobile and converged services. With end users demanding more and higher-quality multimedia content in all environments, the evolution of device technologies will continue to enhance the increasing consumption of data usage. For example, over the last several years, wireless communications technologies have evolved from analog-driven systems to digital systems. Typically in conventional analog systems, the analog signals are relayed on a forward link and a reverse link and require a significant amount of bandwidth to enable signals to be transmitted and received while being associated with suitable quality. As the analog signals are continuous in time and space, no status messages (e.g., messages indicating receipt or non-receipt of data) are generated. In contrast, packet-switched systems allow analog signals to be converted to data packets and transmitted by way of a physical channel between an access terminal and a base station, router, and the like. In addition, digital data can be relayed in its natural form (e.g., text, Internet data, and the like) via employing a packet switched network.

As such, digital wireless communication systems are widely deployed to provide various communication services such as telephony, video, data, messaging, broadcasts, and the like. Such systems commonly employ an access network that connects multiple access terminals to a wide area network (WAN) by sharing the available network resources. The access network is typically implemented with multiple access points dispersed throughout a geographic coverage region. Moreover, the geographic coverage region can be divided into cells with an access point in each cell. Likewise, the cell can be further divided into sectors. However, in such system architecture, supplying an efficient handoff between access systems that do not share the same communication procedures and policies becomes a challenging task.

SUMMARY

The following presents a simplified summary in order to provide a basic understanding of the described aspects. This summary is not an extensive overview and is intended to neither identify key or critical elements nor delineate the scope of such aspects. Its purpose is to present some concepts of the described aspects in a simplified form as a prelude to the more detailed description that is presented later.

The described aspects enable handoff of mobile units among heterogeneous networks, and further supply an interworking between a source access system and a target access system in conjunction with a session handoff therebetween—via employing an inter-system handoff control component. As such, the inter-system handoff control component can supply tunneling in advance, as part of session negotiation between the AT and the target access system—wherein packets are transported via the source access system (e.g., to reduce interruption during handoff and mitigate a requirement to perform session setup during handoff.) Tunnel(s) can be established from the AT to the target access system, wherein from the AT's point of view the signaling of the "mobile-target access system" proceeds over such tunnel. Such tunneling can further be accompanied by establishing other tunnels to the target access system depending on type of tunneling involved (e.g., whether tunneling occurs at data link layer). The source access system can further designate the target access system based on pilot report, wherein the AT can then communicate with the target access system and establish a process for negotiation.

In a related aspect, existing mobility models can be leveraged in conjunction with IP tunneling between the mobile unit and the target access system, to ensure trust and privacy—thereby enabling secure seamless handoff among heterogeneous networks (e.g., devices move across networks and administrative domains.) Exemplary hand off between such heterogeneous access systems can include a handoff between: Ultra Mobile Broadband (UMB) and High Rate Packet Data (HRPD); WiMax/HRPD; Long Term Evolution (LTE)/HRPD, wherein system architectures can implement Internet Protocol (IP) mobility using client mobile IP to actively involve the mobile for handoff preparation. Alternatively, the system can employ systems that are more network controlled than the mobile unit itself. Such inter-working enables handoff for a mobile unit between different access systems, wherein a call can continue without being dropped.

According to a related methodology, a setup can be established between the source access system and the target access system, in preparation for the handoff session. Such set up can include discovery of an IP address for the Inter-Working Security Gateway (IWSG) that ensures security of transmitted packets. The setup can further include discovery of IP address for Radio Access Network (RAN) or RAN-lite of the target access system. Typically, the RAN-lite is a RAN that only contains protocol stacks and not radio transceiver functions. It also supports existing RAN interfaces to core network elements and real RAN. After session has been pre-established with RAN-lite, it can be transferred to the real RAN through existing RAN interface (which is used to support intra-technology inter-RAN handoff). Such enables inter-technology handoff to the target system to be done without requiring upgrades to existing real RANs (to support L3 tunnel from AT), for example.

According to a further aspect, the RAN-lite is associated with a protocol (e.g., contained within the mobile and/or IWSG), which enables the mobile to discover an IP address and establish a tunnel to pre-setup the session for the target radio system. Upon requirement for handoff over the air, then the session that is negotiated in the RAN-lite can be transferred over a well known existing interface. Accordingly, from a perspective of a radio access network, access after handoff can be from the same radio technology, and hence the target radio access system need not be modified to support heterogeneous system radio technology handoff. The RAN-lite can logically function as any other real RAN (e.g., a base station controller)—without actual control of any physical base station. Whenever a mobile establishes tunnel with the RAN-lite, such mobile can negotiate a session with the RAN-lite—so that the mobile can obtain session of the target radio technology, and the RAN-lite can store a copy of the session for the target radio technology, wherein the mobile can still operate on the source radio technology.

As such, upon a handoff from the mobile to the target radio technology over-the-air, the mobile can then access the real RAN of the target access system—e.g., the mobile access, and the target access system ask the mobile whether a session exists for technology to be negotiated. The mobile unit can further supply a Unicast Access Terminal Identifier (UATI) or an equivalent identifier that can be employed to locate the session, wherein the UATI from the mobile can point to the RAN-lite, wherein the real RAN can be used to retrieve the session from the RAN lite to the real RAN. Upon fetching a session, the mobile can then communicate with the real RAN in the target radio system. It is to be appreciated that the real RAN can represent the base station controller that includes real connection to the base station.

The inter-system handoff control component can then implement tunneling between the AT and the target system, wherein signaling/packeting associated with the target system can be transferred over the source system. According to a further aspect, the L3 tunneling provides the functional and procedural processes of transferring variable length data sequences between heterogeneous systems, while maintaining the quality of service, and error control functions. Such tunneling can further be transparent to the underlying access system (e.g., no change to the source for the IP packets) regardless of direction (e.g., from LTE to HRPD or from HRPD to LTE).

In a related aspect, a computer readable medium is supplied, which has codes or computer-executable instructions for; discovering IP addresses of security gateways for the target access system and the source access system; establishing secure tunnels to security gateways and/or any of the heterogeneous access systems.

According to a further aspect a processor is provided that executes instructions and/or includes modules related to discovering addresses for security gateways; establishing tunnels between an AT and source or target access systems.

To the accomplishment of the foregoing and related ends, certain illustrative aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
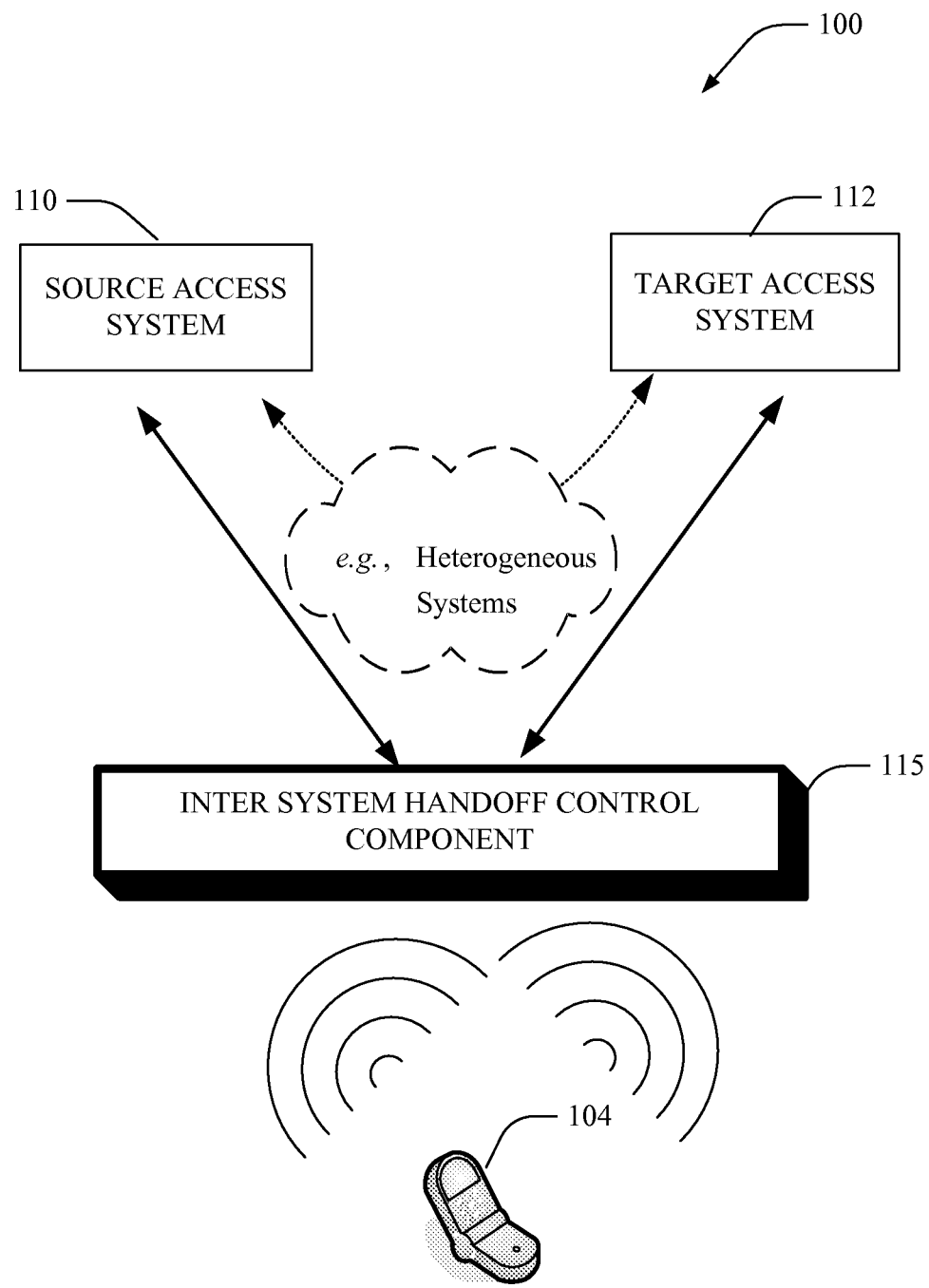
FIG. 1 illustrates an exemplary inter-system handoff control component that supplies tunneling of a communication layer, by the mobile unit from a source access system to a target access system, via the source access system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates a network system 100 that supplies handoff between heterogeneous networks and inter-working between a source access system 110 and a target access system 112. It is to be appreciated that such figure is exemplary in nature and the inter system hand off control component can be part of an Access Terminal (AT). The session between the AT and the target system can be pre-established (transparently of the source system)—e.g., via an L3 tunnel. Such inter-system handoff control component 115 facilitates setting an L3 tunneling by the mobile unit 104 that operates in a dual mode (both in the source access system 110 and the target access system 112.) The inter-system handoff control component 115 initially enables the mobile unit 104 to acquire local domain name associated with the source and/or target access systems 110, 112. Thereafter, the inter-system handoff control component facilitates discovery of an IP address for a security gateway and Radio Access Network (RAN) of the target access system 112. Such gateway acts as a network point for an entrance to the target access system 112. Accordingly, the inter system handoff control component 115 enables the mobile unit 104 to establish L3 tunneling, wherein signaling and packeting associated with the target access system 112 can then be transferred over the source access system thru seamless operation.

As such, the inter-system handoff control component 115 can utilize tunneling in advance of a handoff to exchange handover set-up and execution packets as part of session negotiation between the AT 104 and the target access system 112, to reduce interruption during handoff and mitigate a requirement to perform session setup during handoff. The inter-system handoff control component 115 further enables communication data packets to be transported via the source access system 110, wherein such source access system 110 is typically not engaged during negotiations between the AT 104 and the target access system 112.

Figure 2:
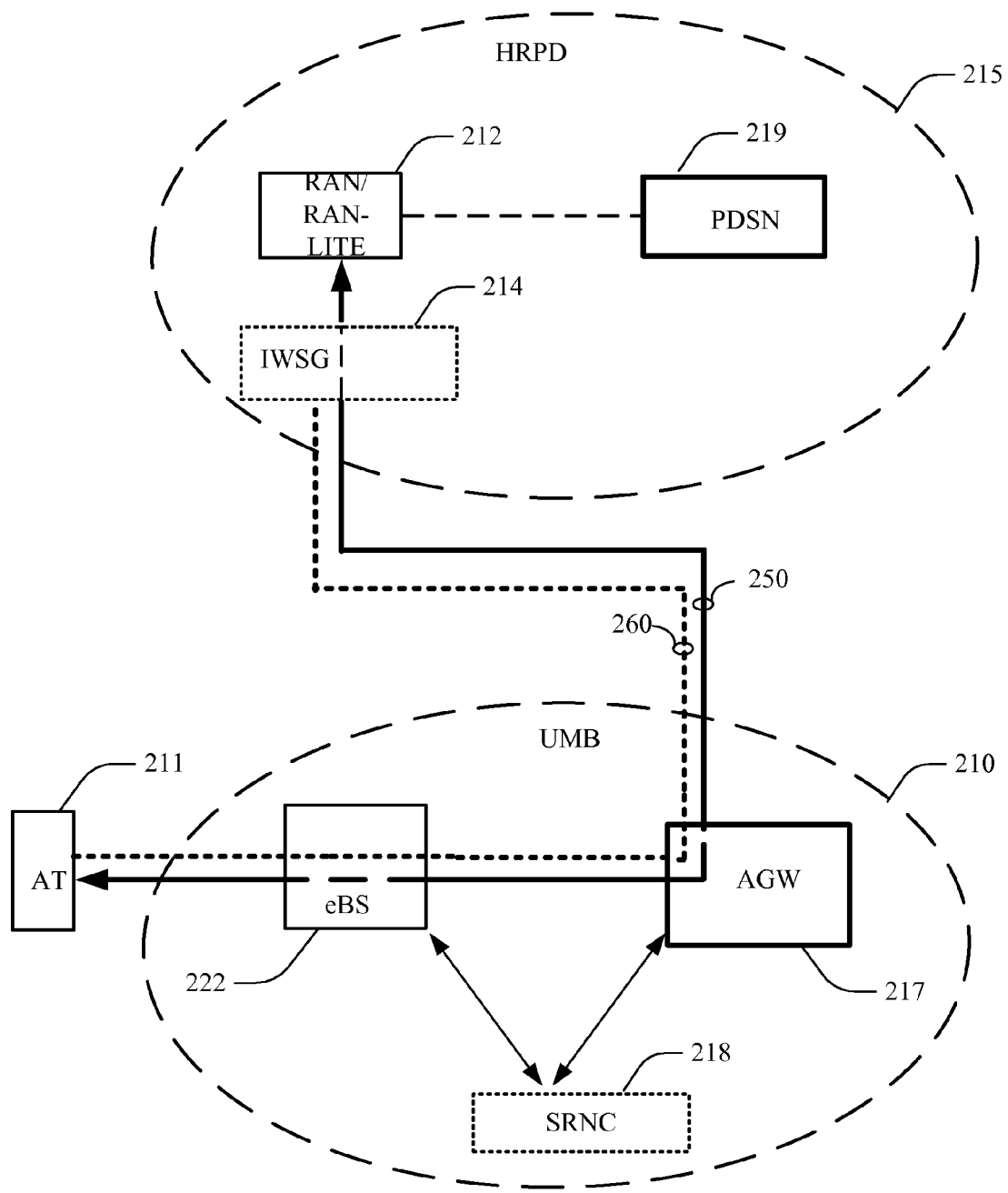
FIG. 2 illustrates a particular handoff via L3 tunneling for Ultra Mobile Broadband (UMB) and High Rate Packet Data (HRPD) systems according to a further aspect.
Figure 3:
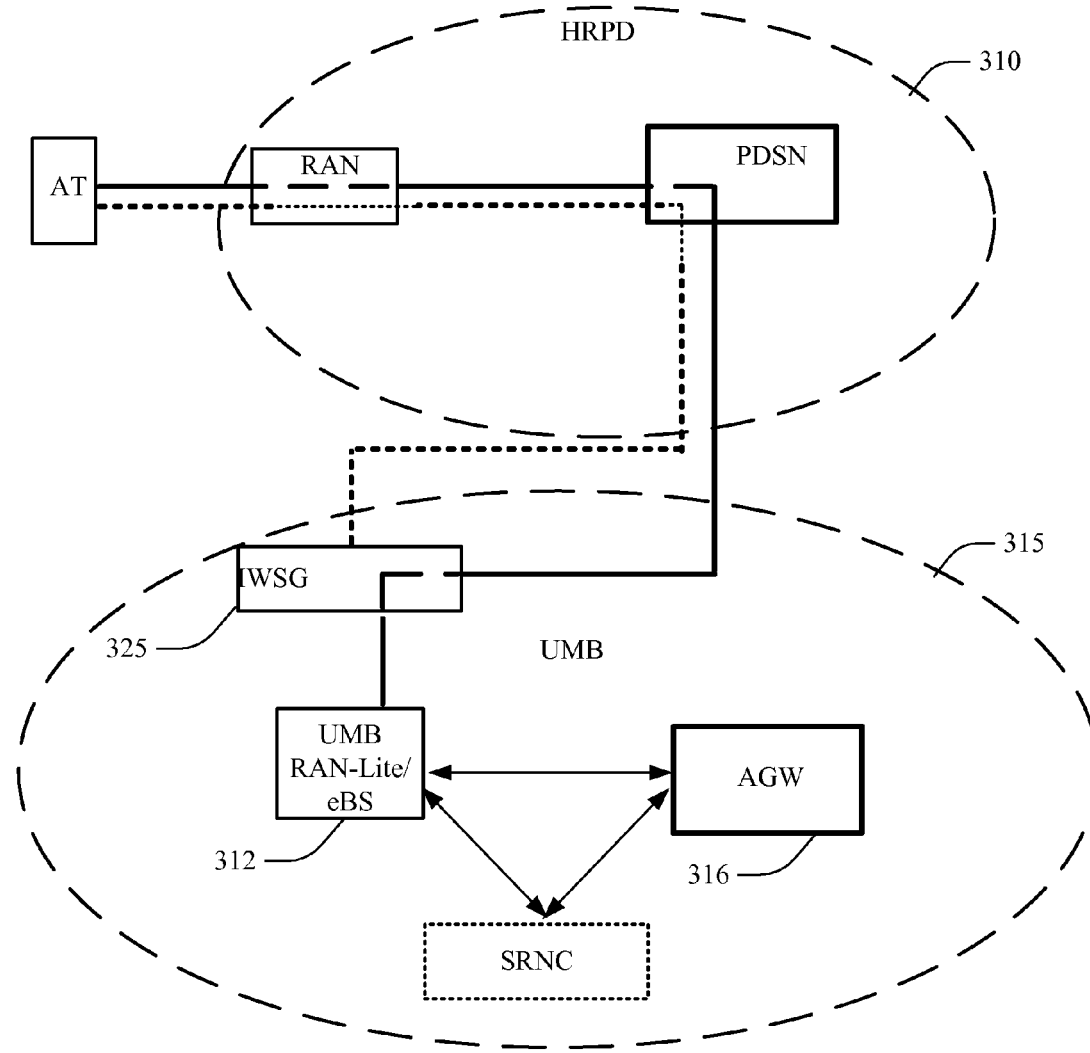
FIG. 3 illustrates an exemplary handoff via L3 tunneling for HRPD-UMB systems.

FIG. 2 and FIG. 3 illustrate particular aspects for handoff via L3 tunneling from a UMB system 210 to an HRPD system 215 and vice-versa. In FIG. 2, the source access system is represented by the UMB system 210, wherein the access terminal or mobile unit 211 is in communication with the evolved Base Station (eBS) 222, wherein IP packets are transferred from the eBS to the gateway and the home agent to the Internet. Upon request of a handoff from the UMB 210 (which represents the source access system) to the HRPD access system 215 (which represents the target access system)—a setup for the HRPD is initiated, during which the mobile unit 211 still remains in the UMB system 210. The inter-system handoff control component can then implement tunneling between the UMB 210 and the HRPD 215, wherein HRPD signaling and associated packeting can be transferred transparently over L3 tunneling that may be transported over IP via the UMB system 210.

Accordingly, the path line 250 indicates the traffic line, wherein the mobile unit 211 in the UMB 210 requires discovery of the Radio Access Network RAN/RAN lite 212 and associated IP address of the HRPD 215, to prepare and setup communication (e.g., for packet transfer.) Upon discovery of the IP address, signaling for the HRPD 215 can then be transmitted over such RAN lite IP address/packeting, wherein the packets can pass through the Access Gateway (AGW) 217 in the UMB system and can then be transmitted to the RAN lite 212. The Packet Data Serving Node (PDSN) 219 acts as the connection point between the HRPD RAN 212 and IP networks—wherein the Inter-Working Security Gate (IWSG) 214 can supply security (e.g., for IP) over the IPsec tunnel 260, to secure the packet transmission between the AT 211 and the RAN/RAN lite 212. Such gateway 214 acts as a network point for an entrance to the HRPD target access system 215. In addition, the Session Reference Network Controller (SRNC) 218 typically includes authentication functions and associated configurations, which are negotiated between base station 222 and access terminal 211, and functions as a reference for the base station 222 to retrieve information (e.g., obtain session information to avoid conflicts during session change.)

Similarly, FIG. 3 illustrates a further aspect for a handoff via L3 tunneling from an HRPD 310 to a UMB system 315. When a handoff request is made from the source system HRPD 310 to the target system UMB 315, the UMB RAN/lite-eBS 312 can be discovered and associated UMB gateway(s) identified 316, 325. For example, initially a UMB RAN-lite 312 can be discovered that is associated with the Inter Working Security Gateway (IWSG) 325. Subsequently, upon discovery of such IP address, packets can then be sent to the destination IP address based on tunneling at layer 3 of the communication protocol. Such advance setup can then facilitate the ensuing packet flow to the UMB target system 315.

Figure 4:
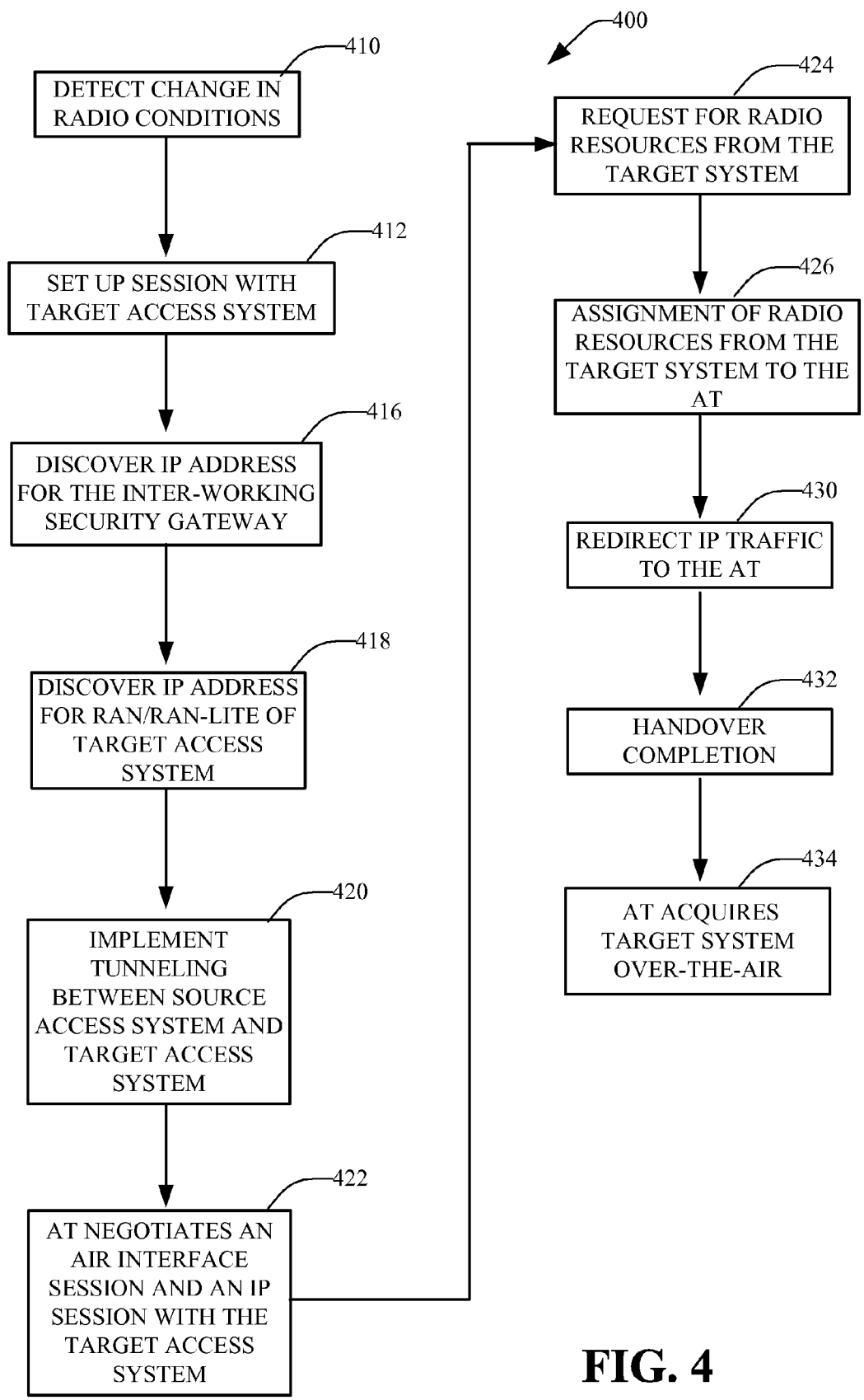
FIG. 4 illustrates a related methodology of transferring a session state from a source access system to a target access system according to an aspect.

FIG. 4 illustrates an exemplary methodology for a handoff between heterogeneous systems in accordance with an aspect. While the exemplary method is illustrated and described herein as a series of blocks representative of various events and/or acts, the subject aspect is not limited by the illustrated ordering of such blocks. For instance, some acts or events may occur in different orders and/or concurrently with other acts or events, apart from the ordering illustrated herein, in accordance with the described aspects. In addition, not all illustrated blocks, events or acts, may be required to implement a methodology in accordance with the subject aspects. Moreover, it will be appreciated that the exemplary method and other methods according to the described aspects may be implemented in association with the method illustrated and described herein, as well as in association with other systems and apparatus not illustrated or described. Initially and at 410, changes in radio conditions can be detected, which can trigger a request for handoff preparation from the AT to a target access system. Alternatively, trigger for handoff preparation can be due to advertisement of the target access system as the neighboring technology to the source access system. Subsequently and in preparation for the handoff session, at 412 a setup can be established between the AT and the target access system. Such set up can include discovery of an IP address at 416 for the inter-working security gateway that ensures security of transmitted packets. The setup can further include discovery of IP address for RAN/RAN-lite of the target access system, at 418. The inter-system handoff control component can then implement tunneling between the AT and the target access system at 420, wherein signaling/packeting associated with the target system can be transferred over the source system. Moreover, at 422 the AT negotiates an air interface session and an IP session with the target access system. As such, at 424 a request for radio resources from the target system is received followed by assignment of radio resources from the target system to the AT at 426. Accordingly, IP traffic can be redirected to the AT at 430 (or can also be positioned after act 434) followed by handover completion at 432. Subsequently, at 434 AT acquires target system over-the-air.

The followings is a particular example of Fully Qualified Domain Names for DNS lookup in which any IP host (such as the AT) can perform with DNS server. Exemplary calls for security gateway and RAN/RAN-lite discovery of the target system can include:

From UMB to HRPD Active Handoff
    <HRPD-subnet>.HRPD.IWSG.<local-domain-name>
    <HRPD-subnet>.HRPD.RAN.<local-domain-name>
From HRPD to UMB Active Handoff
    <UMB-ANID>.UMB.IWSG.<local-domain-name>
    <UMB-ANID>.UMB.RAN.<local-domain-name>
From WiMAX to HRPD Active Handoff
    <HRPD-subnet>.HRPD.IWSG.<local-domain-name>
    <HRPD-subnet>.HRPD.RAN.<local-domain-name>

-continued

From HRPD to WiMAX Active Handoff
    <WiMAX-APID>.WiMAX.IWSG.<local-domain-name>
    <WiMAX-APID>.WiMAX.RAN.<local-domain-name>
From LTE to HRPD Active Handoff
    <HRPD-subnet>.HRPD.IWSG.<local-domain-name>
    <HRPD-subnet>.HRPD.RAN.<local-domain-name>
From HRPD to LTE Active Handoff
    <LTE-eNBID>.LTE.IWSG.<local-domain-name>
    <LTE-eNBID>.LTE.RAN.<local-domain-name>

HRPD subnet, UMB ANID, WiMax APID, and LTE-eNBID can be obtained either directly over-the-air by the target access system or through neighbor technology record advertised by the source access system.

Figure 5:
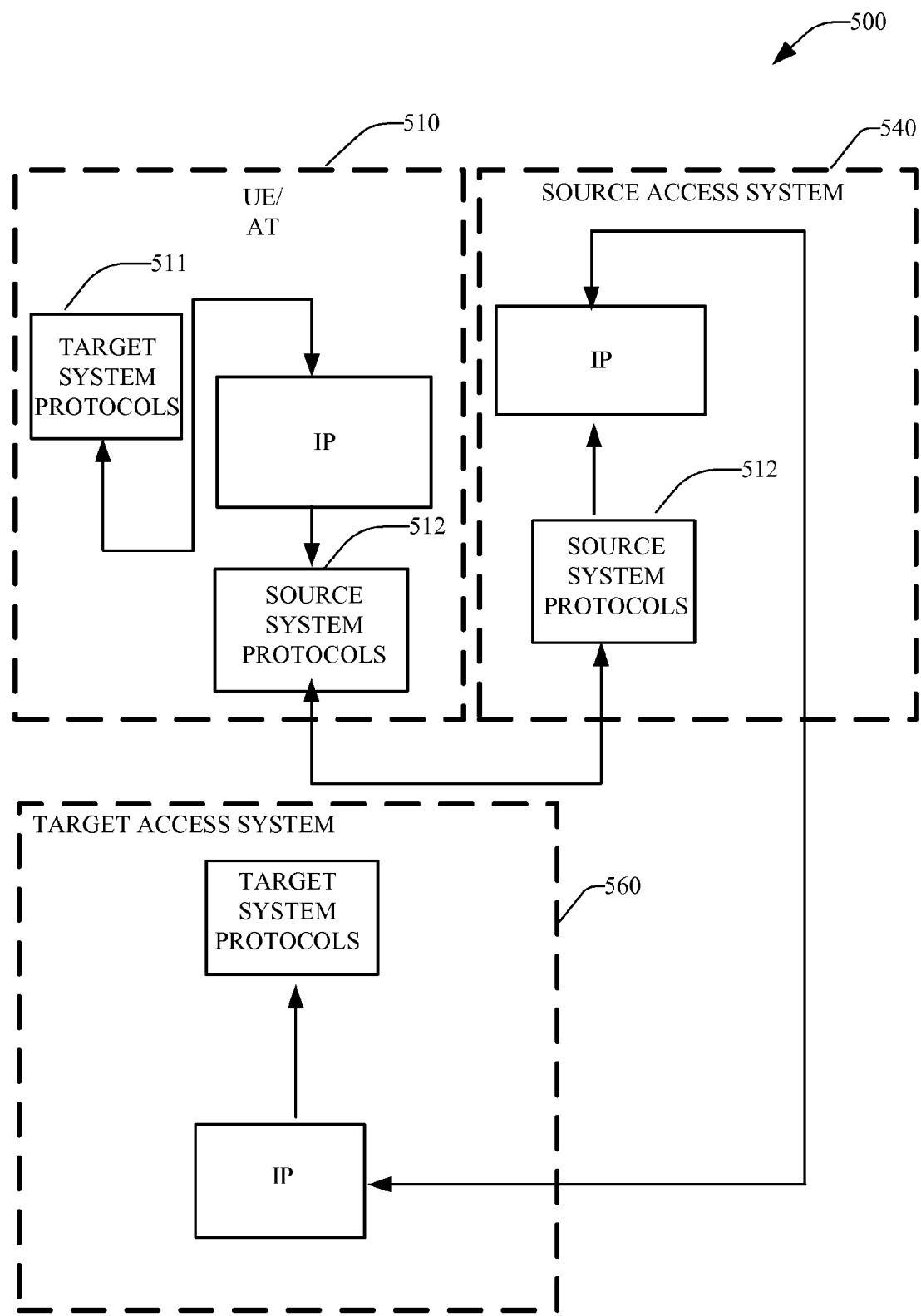
FIG. 5 illustrates a layering arrangement of supplying a handoff between user equipment and source/target access system according to a particular aspect.

FIG. 5 illustrates an exemplary block diagram for an interaction among User Equipment or access terminal 510, the source access system 540 and the target access system 560. The UE 510 includes both the target system protocol 511 and the source system protocol 512, to enable dual mode operation with both systems. Such an arrangement enables discovery for IP address of IWSG and establish IPsec tunnel. Moreover, the IP address of a target RAN can be discovered to enable preset up of the target RAN session. The arrangement 500 facilitates session handoff from the source access system 540 to the target access system 560, utilizing handover preparation and handover execution prior to the handover, by implementing the IPsec tunnel.

Figure 6:
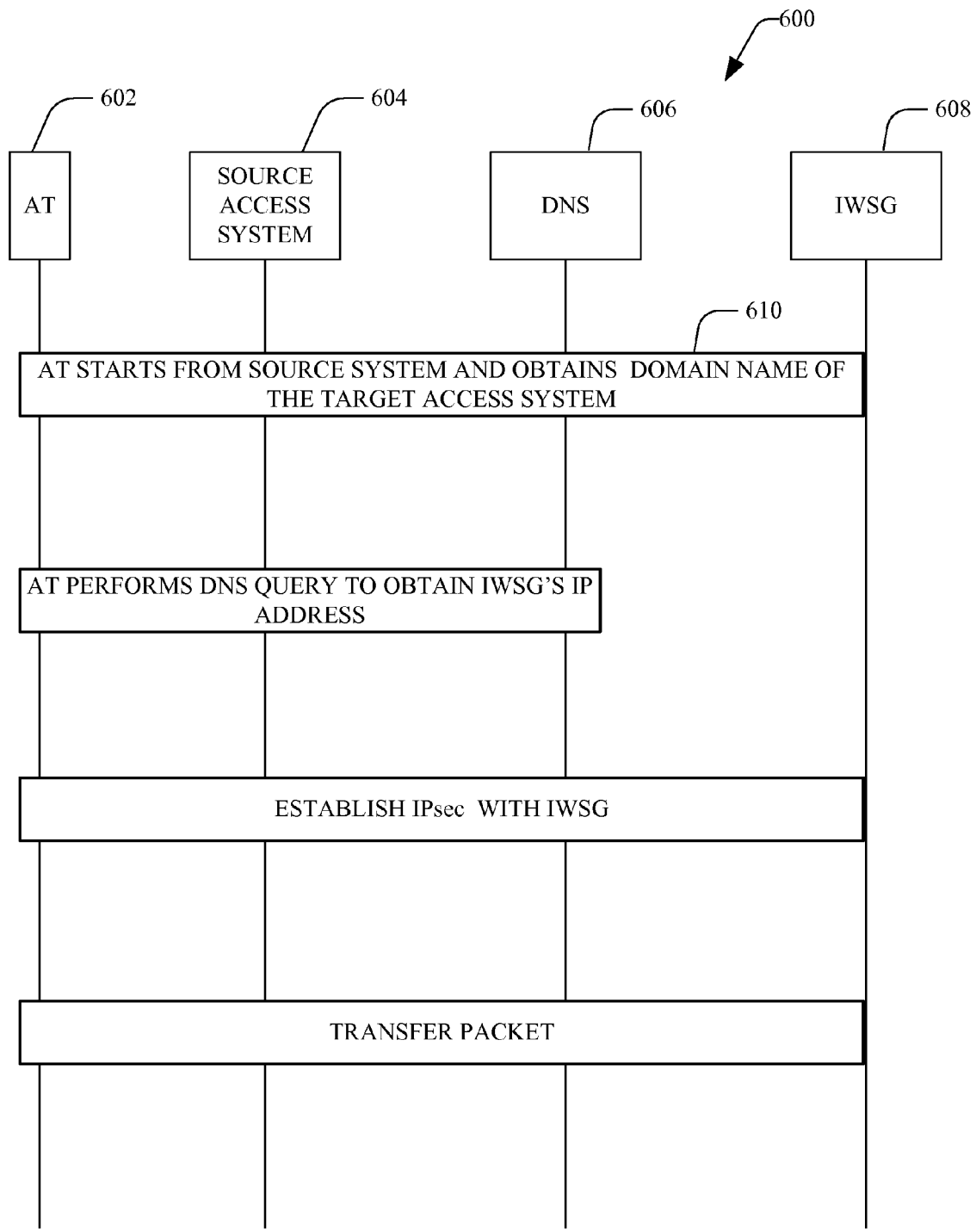
FIG. 6 illustrates a call flow in accordance with an exemplary aspect.

FIG. 6 illustrates an exemplary call flow 600 for establishing an IP security tunnel in accordance with a further aspect. AT 602 is initially associated with the source access system 604, and obtains domain name for the target access system via a call 610. Accordingly, the AT 602 can issue a Domain Name System (DNS) 606 query to obtain an IP address for inter work security gateway (IWSG) 608 for accessing the target access system. Moreover, such DNS query can further include discovery of IP address for RAN/RAN-lite of the target access system. The AT 602 can then initiate tunneling to the target access system, wherein signaling/packeting associated with the target system can be transferred over the source system 604. As explained earlier, exemplary hand off between such heterogeneous access systems can include handoff between UMB/HRPD; WiMax/HRPD; LTE/HRPD, wherein system architectures can implement IP mobility using client mobile IP to actively involve the mobile or access terminal 602 for handoff preparation; or alternatively employ systems that are more network controlled than the mobile unit itself Such inter-working can enable a session handoff for a mobile unit between different access systems, wherein a call can continue without being dropped.

Figure 7:
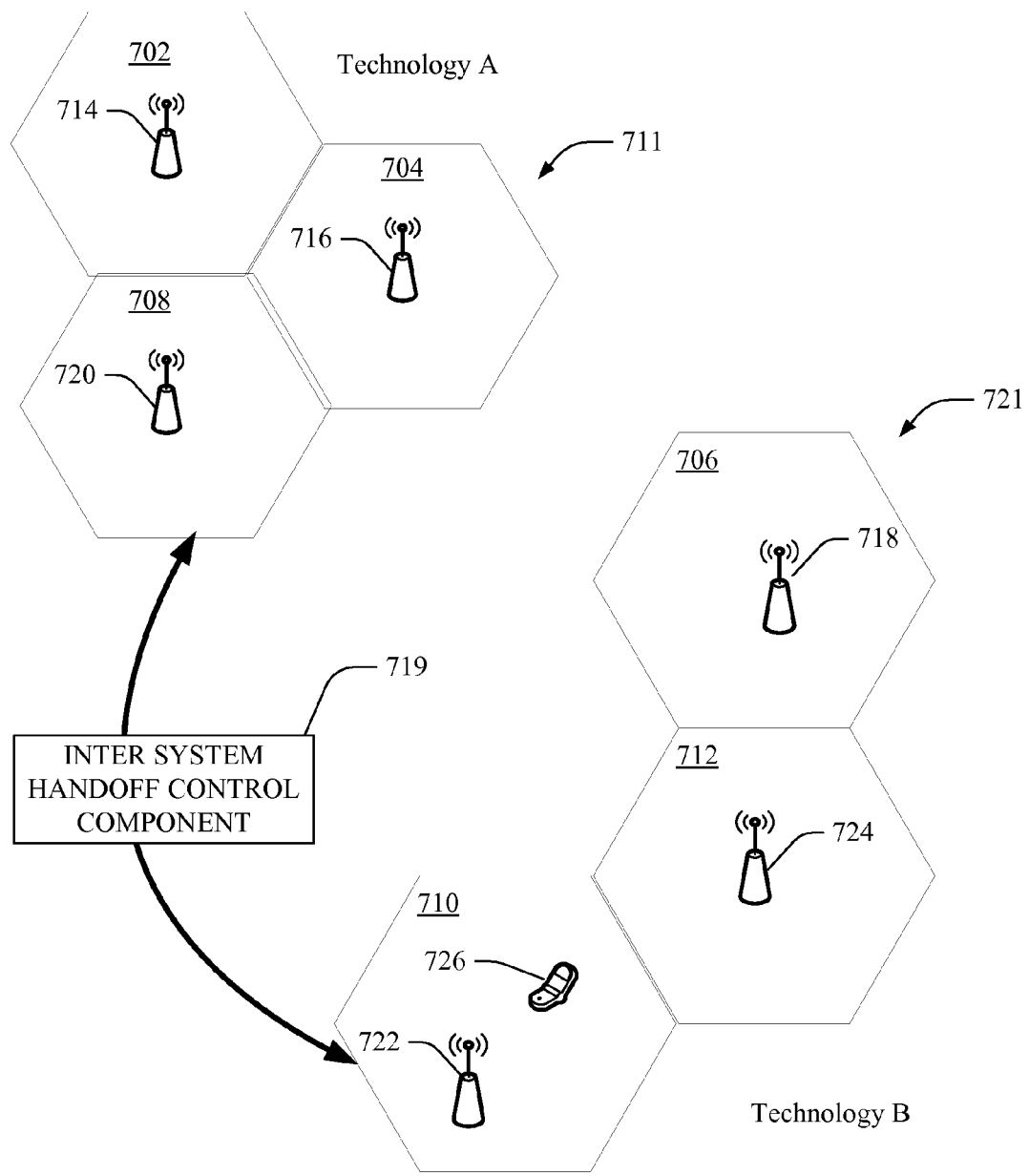
FIG. 7 illustrates a system that can implement a handoff in L3 layer according to an aspect.

FIG. 7 illustrates exemplary heterogeneous wireless communications systems 711, 721 that can supply service to a wireless terminal 726. The systems 711, 721, represent a target access system and a source access system respectively, which include a plurality of sectors 702, 704, 708, and 706 710, 712. The target access system 711 and the source access system 721 can employ different wireless services within such sectors. While such sectors are shown as being hexagonal in nature and of substantially similar size, it is understood that size and shape of these sectors can vary depending upon geographical region, number, size, and shape of physical impediments, such as buildings, and several other factors. Access points (base stations, access routers, etc.) 714, 716, 720 are associated with sectors 702, 704, 708, wherein technology "A" is employed as part thereof. Similarly, access points 718, 722, 724 are associated with sectors 706, 712, 710, wherein technology "B" is employed as part thereof, wherein technology "B" is different from technology "A."

As wireless terminal 726 is geographically ported, it may receive signals with greater strength from target access system 711 when compared to signals received from source access system 721. It is to be appreciated that the wireless terminal 726 can operate in dual mode with both the source access system 721 and the target access system 711—wherein the inter-system handoff control component 719 can supply tunneling in advance of the handoff as part of session negotiation between the AT 726 and the target access system 711. Accordingly, data packets can be transported (either transparently or non-transparently)) via the source access system 721 while the AT is preparing for handoff to the target system, and then the data packets can be redirected to the target system once the handoff is completed.

Figure 8:
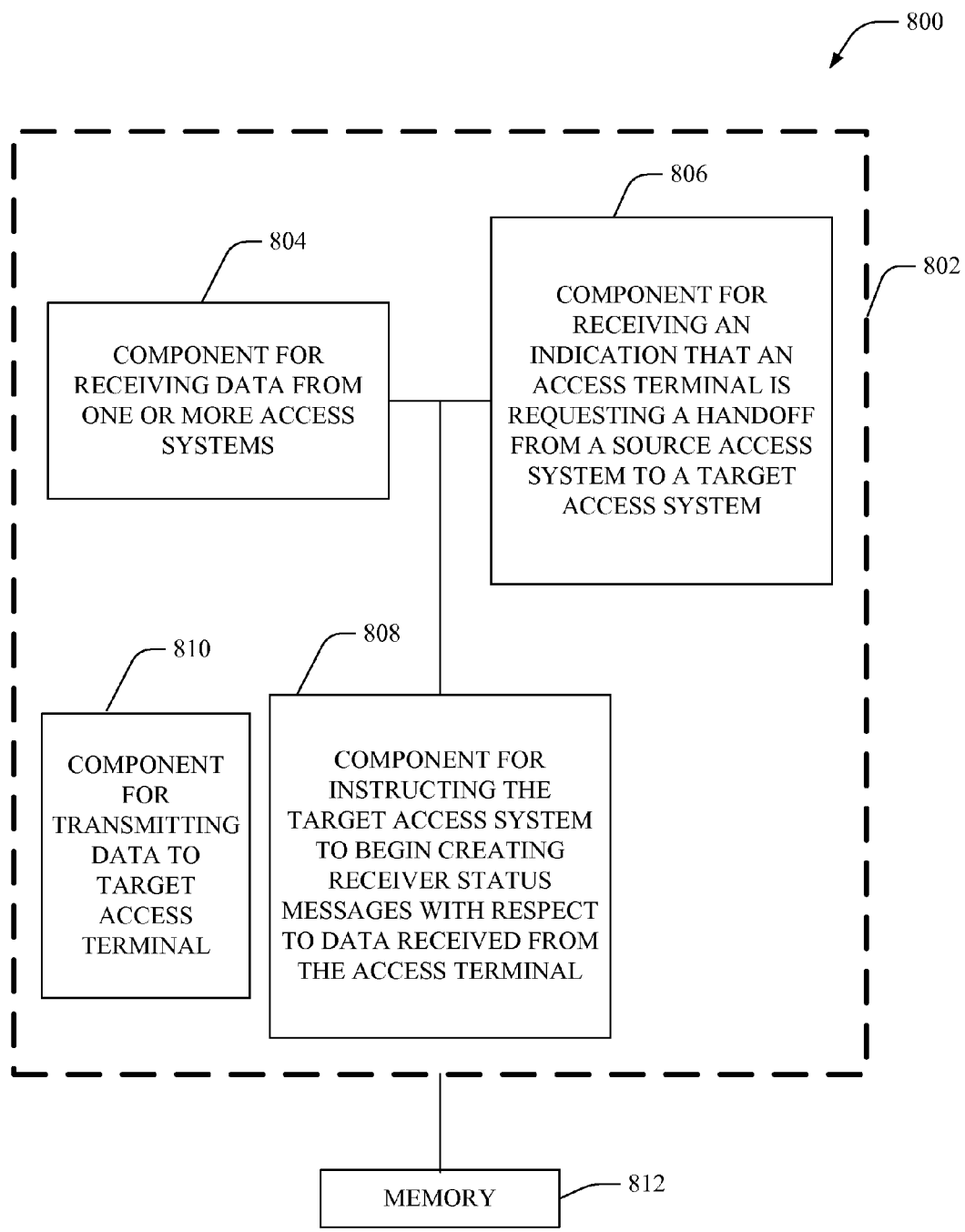
FIG. 8 illustrates a particular system that facilitates transmittal of data to an access terminal when a handoff is requested in L3 layer.

FIG. 8 illustrates a particular system 800 that facilitates transmittal of data between heterogeneous access systems when a handoff is requested via an L3 tunneling established by the mobile unit. The system 800 can be associated with an access point and includes a grouping 802 of components that can communicate with one another in connection with transmitting data to an access terminal during a handoff between heterogeneous access systems. Grouping 802 includes components 804 for determining that an access terminal has requested a handoff from a first access system to a second access system. For example, such determination can occur by analyzing an identity of a target access system by the access terminal. Such identity can include any suitable indicia employed to identify the IP addresses of target system modules amongst one or more other access system modules. It is to be appreciated that various processes for indicating an identity of the target access can be contemplated for the described aspects and are intended to be covered thereby.

Grouping 802 also includes a component 806 for receiving data from the first access as well as receiving an indication of what data should next be transmitted to the access terminal from such first access system. For example, a timestamp or other sequence number in an RLP packet header can indicate what data should be next transmitted to the access terminal. Grouping 802 additionally includes a component 808 for receiving data from a network module, wherein the data is desirably transmitted to the access terminal. Moreover, the data received from the network module can be an IP-encapsulated data packet that is associated with a sequence number or stamp, thereby enabling the second transceiver function to determine what data to next transmit to the access terminal. Grouping 802 can further include a component 810 for transmitting data to the access terminal in an appropriate sequence, wherein the data is received from the first access system and the network module. For example, the second access system can receive data to be transmitted to the access terminal, wherein the data is not duplicative and is to be transmitted in a particular sequence. System 800 can also include a memory 812, which can retain instructions relating to executing components 804-810. The system 800 enables new or target access system to start receiving data in preparation of handoff even though the source has not relinquished control yet and data is lining up at the target access system. Such target access system has information required to re-instate information of the network layer protocol and transmitted data, wherein by not interrupting a current data transfer—the handoff can occur at substantially high speed and low dead time.) The system 800 can be incorporated as part of a distributed and/or centralized architecture.

Figure 9:
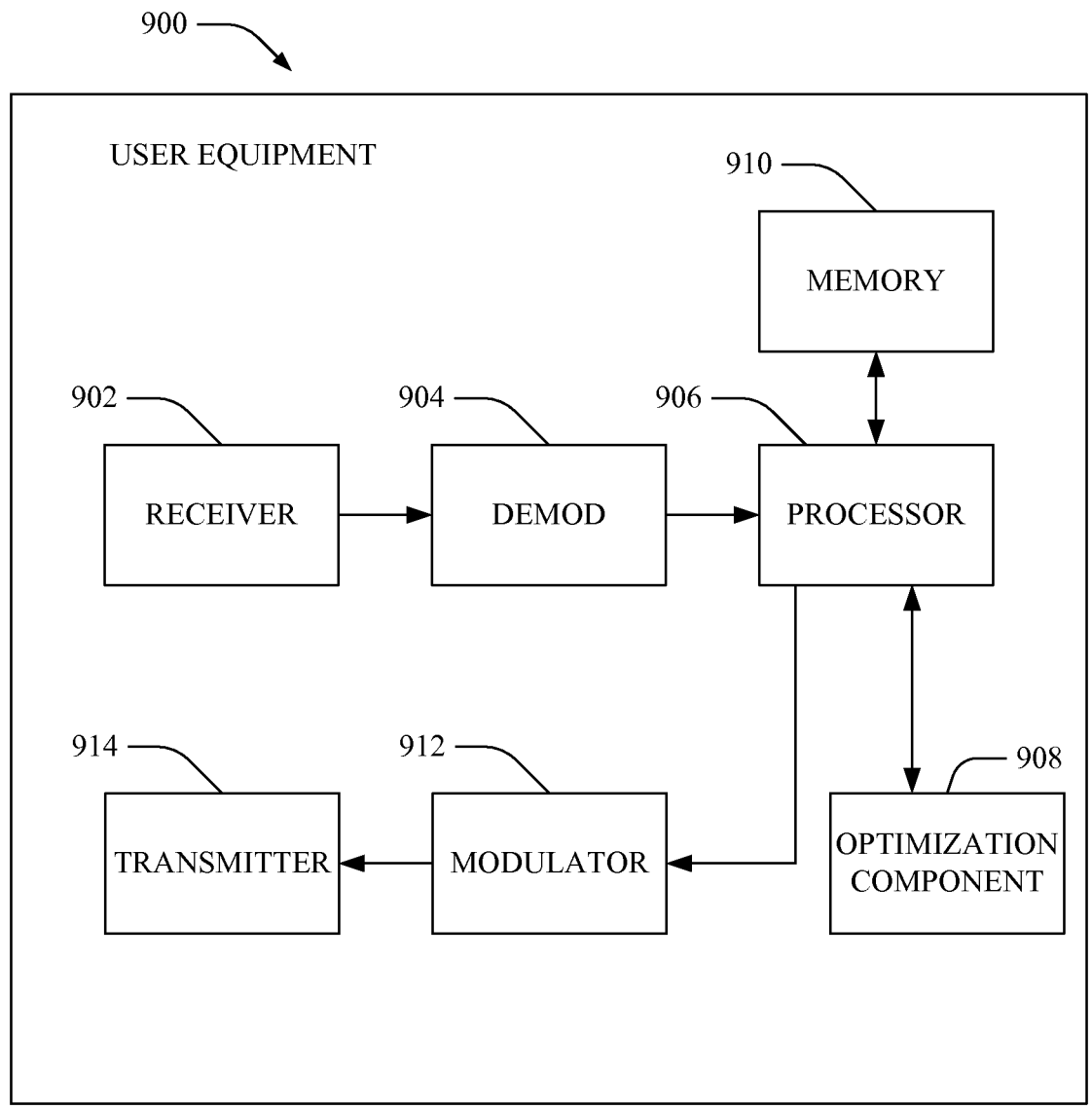
FIG. 9 illustrates a system that can be implemented as part of transmitting data to an access terminal before and after a handoff in L3 layer.

FIG. 9 illustrates a system 900 that can be employed in connection with transmitting data to an access terminal before and after a handoff in L3 layer. System 900 comprises a receiver 902 that receives a signal from, for instance, one or more receive antennas, and performs typical actions thereon (e.g., filters, amplifies, downconverts, . . . ) the received signal and digitizes the conditioned signal to obtain samples. A demodulator 904 can demodulate and provide received pilot symbols to a processor 906 for channel estimation.

Processor 906 can be a processor dedicated to analyzing information received by receiver component 902 and/or generating information for transmission by a transmitter 914. Processor 906 can be a processor that controls one or more portions of system 900, and/or a processor that analyzes information received by receiver 902, generates information for transmission by a transmitter 914, and controls one or more portions of system 900. System 900 can include an optimization component 908 that can optimize performance of user equipment before, during, and/or after handoff. Optimization component 908 may be incorporated into the processor 906. It is to be appreciated that optimization component 908 can include optimization code that performs utility based analysis in connection with determining whether to handoff from a source access system to a target access system. The optimization code can utilize artificial intelligence based methods in connection with performing inference and/or probabilistic determinations and/or statistical-based determination in connection with performing handoffs.

System (user equipment) 900 can additionally comprise memory 910 that is operatively coupled to processor 906 and that stores information such as signal strength information with respect to a base station, scheduling information, and the like, wherein such information can be employed in connection with determining whether and when to request a handoff. Memory 910 can additionally store protocols associated with generating lookup tables, etc., such that system 900 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 is intended to comprise, without being limited to, these and any other suitable types of memory. Processor 906 is connected to a symbol modulator 912 and transmitter 914 that transmits the modulated signal.

Figure 10:
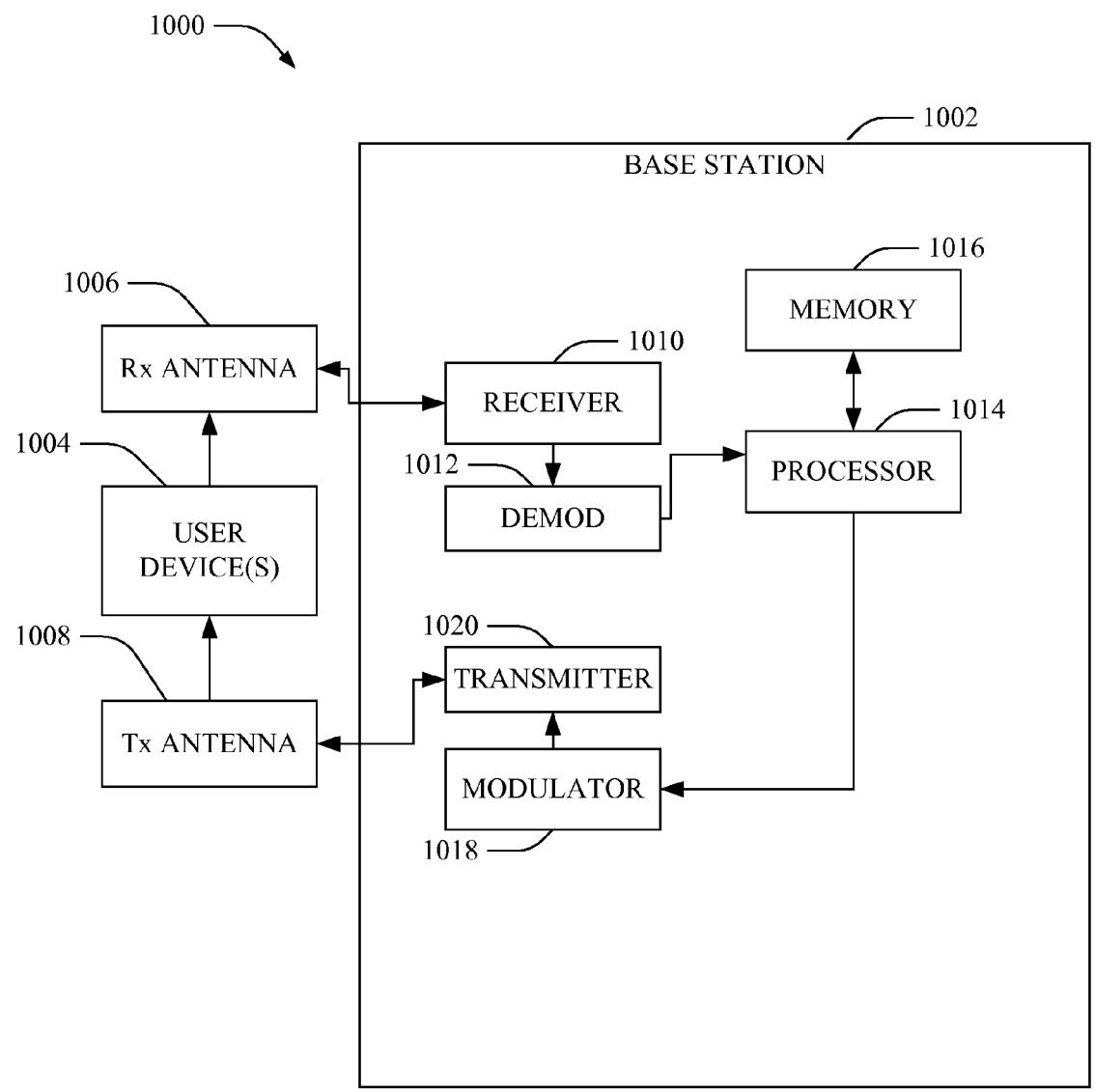
FIG. 10 illustrates a system that can be employed in connection with receiving an indication of handoff and/or transmitting data to an access terminal accordingly.

FIG. 10 illustrates a system that can be employed in connection with receiving an indication of handoff and/or transmitting data to an access terminal accordingly. System 1000 comprises a base station 1002 with a receiver 1010 that receives signal(s) from one or more user devices 1004 by way of one or more receive antennas 1006, and transmits to the one or more user devices 1004 through a plurality of transmit antennas 1008. In one example, receive antennas 1006 and transmit antennas 1008 can be implemented using a single set of antennas. Receiver 1010 can receive information from receive antennas 1006 and is operatively associated with a demodulator 1012 that demodulates received information. Receiver 1010 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1014 that is similar to the processor described above with regard to FIG. 9, and is coupled to a memory 1016 that stores information related to user device assignments, lookup tables related thereto and the like. Receiver output for each antenna can be jointly processed by receiver 1010 and/or processor 1014. A modulator 1018 can multiplex the signal for transmission by a transmitter 1020 through transmit antennas 1008 to user devices 1004.

As used in herein, the terms "component," "system" and the like are intended to refer to a computer-related entity, either hardware, a combination of hardware and software, software or software in execution and/or electromechanical units. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the described aspects or portion thereof in any manner. It is to be appreciated that a myriad of additional or alternate examples could have been presented, but have been omitted for purposes of brevity.

Furthermore, all or portions of the described aspects may be implemented as a system, method, apparatus, or article of manufacture using standard programming and/or engineering techniques to produce software, firmware, hardware or any combination thereof to control a computer to implement the disclosed aspects. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of session handoff between a source access system and a target access system comprising:

discovering an address of the target access system by an access terminal (AT) in communication with the source access system;

utilizing the address to tunnel a secure channel from the AT to the target access system through the source access system, the tunneling configured for negotiating an air interface session between the AT and the target access system; and transferring signaling associated with the target access system from the AT via the secure channel to the target access system, wherein the negotiating the air interface session includes obtaining session information stored at the target access system for the air interface session between the AT and the target access system.

2. The method of claim 1, the tunneling further comprising tunneling a secure channel to a security gateway of the target access system.

3. The method of claim 1, further comprising monitoring a pilot of the target access system while operating in the source access system.

4. The method of claim 1, further comprising establishing a tunnel from the AT to the source access system, wherein the source access system or the target access system is operable based on at least one of a 3GPP specification, a 3GPP2 specification, or an IEEE specification.

5. The method of claim 1, further comprising negotiating the air interface session between the AT and the target access system via the secure channel to facilitate handover of a communication session of the AT from the source access system to the target access system.

6. The method of claim 1, wherein transferring the signaling comprises negotiating a session in a protocol of the target access system prior to a handoff from the source access system to the target access system.

7. An apparatus configured to perform session handoff comprising:

a processor comprising:

a processor module for discovering an address of a target access system for tunneling between a source access system and the target access system; and a processor module for establishing a secure tunnel from an access terminal (AT) to a security gateway of the target access system using the address, the tunnel configured for negotiating an air interface session between the AT and the target access system and extending through the source access system, wherein the negotiating the air interface session includes obtaining session information stored at the target access system for the air interface session between the AT and the target access system; and a memory coupled with the processor.

8. A non-transitory computer-readable medium comprising sets of codes stored thereon, which, when executed by a processor, cause the processor to perform session handoff between a source access system and a target access system, the sets of codes comprising:

a first set of codes for discovering an address of a security gateway of the target access system for tunneling from an access terminal (AT); and a second set of codes for establishing a secure tunnel to the security gateway of the target access system using the address and for redirecting user traffic to the target access system via the secure tunnel, the secure tunnel configured for negotiating an air interface session between the AT and the target access system, wherein the negotiating the air interface session includes obtaining session information stored at the target access system for the air interface session between the AT and the target access system.

9. An access terminal (AT), comprising:

means for discovering an address of a target access system for tunneling from the AT;

means for establishing a secure channel from the AT through a source access system to a security gateway of the target access system using the address, the secure channel configured for negotiating an air interface session between the AT and the target access system, wherein the negotiating the air interface session includes obtaining session information stored at the target access system for the air interface session between the AT and the target access system; and means for transmitting signals through the secure channel.

10. A method of session handoff between a source access system and a target access system comprising:

discovering an address of the target access system for tunneling from an access terminal (AT);

tunneling a secure channel from the AT extending through the source access system to the target access system using the address, the tunneling configured for negotiating an air interface session between the AT and the target access system, wherein the negotiating the air interface session includes obtaining session information stored at the target access system for the air interface session between the AT and the target access system; and receiving user traffic from the target access system at the AT.

11. The method of claim 10, further comprising monitoring a target access system pilot while operating in the source access system.

12. The method of claim 10, wherein the source access system or the target access system is operable based on at least one of a 3GPP specification, a 3GPP2 specification, or an IEEE specification.

13. The method of claim 10, further comprising negotiating the air interface session between the AT and the target access system via the secure channel to facilitate handover of a communication session of the AT from the source access system to the target access system.

14. The method of claim 10, wherein the receiving user traffic comprises receiving user traffic via the secure channel.

15. The method of claim 10, wherein the receiving user traffic comprises receiving user traffic via the negotiated air interface.

16. The method of claim 10, wherein the tunneling further comprises tunneling a secure channel to a security gateway of the target access system.

17. An apparatus configured to perform session handoff comprising:

a processor comprising:

a processor module for discovering an address of a target access system; and a processor module for establishing a tunnel from an access terminal (AT) to the target access system using the address, the tunnel comprising a secure channel extending through a source access system and configured for negotiating an air interface session between the AT and the target access system, wherein the negotiating the air interface session includes obtaining session information stored at the target access system for the air interface session between the AT and the target access system;

a receiver for recieving user traffic from the target access system at the AT; and a memory coupled with the processor.

18. The apparatus of claim 17, further comprising a processor module for monitoring a target access system pilot while operating in the source access system.

19. The apparatus of claim 17, wherein the source access system or the target access system is operable based on at least one of a 3GPP specification, a 3GPP2 specification, or an IEEE specification.

20. The apparatus of claim 17, wherein the processor module for establishing negotiates the air interface session between the AT and the target access system via the secure channel to facilitate handover of a communication session of the AT from the source access system to the target access system.

21. The apparatus of claim 17, wherein the receiver for receiving user traffic is configured to receive user traffic via the secure channel.

22. The apparatus of claim 17, wherein the receiver for receiving user traffic is configured to receive user traffic via the negotiated air interface.

23. The apparatus of claim 17, wherein the processor module for establishing tunnels a secure channel to a security gateway of the target access system.

24. A non-transitory computer-readable medium comprising sets of codes stored thereon, which, when executed by a processor, cause the processor to perform session handoff between a source access system and a target access system, the sets of codes comprising:

a first set of codes for discovering an address of the target access system;

a second set of codes for establishing a tunnel from an access terminal (AT) to the target access system using the address, the tunnel extending through the source access system and configured for negotiating an air interface session between the AT and the target access system, wherein the negotiating the air interface session includes obtaining session information stored at the target access system for the air interface session between the AT and the target access system; and a third set of codes for receiving user traffic from the target access system at the AT.

25. An apparatus for session handoff between a source access system and a target access system comprising:
means for discovering an address of the target access system for tunneling from an access terminal (AT);
means for establishing a secure channel to the target access system through the source access system using the address of the target access system, the secure channel configured for negotiating an air interface session between the AT and the target access system, wherein the negotiating the air interface session includes obtaining session information stored at the target access system for the air interface session between the AT and the target access system; and
means for receiving user traffic from the target access system at the AT.

26. The apparatus of claim 25, wherein the means for establishing further comprises means for negotiating the air interface session between the AT and the target access system via the secure channel to facilitate handover of a communication session of the AT from the source access system to the target access system.

27. The apparatus of claim 25, wherein the means for establishing further comprises means for negotiating the air interface session in a protocol of the target access system prior to a handoff from the source access system to the target access system.

28. The apparatus of claim 25, further comprising means for monitoring a target access system pilot while operating in the source access system.

29. The apparatus of claim 25, wherein the source access system or the target access system is operable based on at least one of a 3GPP specification, a 3GPP2 specification, or an IEEE specification.

30. The apparatus of claim 25, wherein the means for receiving user traffic further comprises means for receiving user traffic via the secure channel.

31. The apparatus of claim 25, wherein the means for receiving user traffic further comprises means for receiving user traffic via the negotiated air interface.

32. The apparatus of claim 25, wherein the means for establishing comprises means for tunneling a secure channel to a security gateway of the target access system.

33. A method of session handoff between a source access system and a target access system comprising:
communicating, by the target access system, with an access terminal (AT) via the source access system over a tunneled secure channel, the secure channel configured for negotiating an air interface session between the AT and the target access system;
transmitting, from the target access system to the AT, stored air interface session information for the air interface session between the AT and the target access system;
establishing a connection with the AT over the negotiated air interface; and transmitting user traffic to the AT.

34. The method of claim 33, wherein the source access system or the target access system is operable based on at least one of a 3GPP specification, a 3GPP2 specification, or an IEEE specification.

35. The method of claim 33, further comprising negotiating the air interface session between the AT and the target access system via the secure channel to facilitate handover of a communication session of the AT from the source access system to the target access system.

36. The method of claim 33, wherein the transmitting user traffic comprises transmitting user traffic via the secure channel.

37. The method of claim 33, wherein the transmitting user traffic comprises transmitting user traffic via the negotiated air interface.

38. An apparatus configured to perform session handoff comprising:
a processor module for communicating, by the target access system, with an access terminal (AT) via the source access system over a tunneled secure channel, the secure channel configured for negotiating an air interface session between the AT and the target access system;
a transmitter for transmitting, from the target access system to the AT, stored air interface session information for the air interface session between the AT and the target access system; and
a processor module for establishing a connection with the AT over the negotiated air interface,
wherein the transmitter is configured to transmit user traffic to the AT.

39. The apparatus of claim 38, wherein the source access system or the target access system is operable based on at least one of a 3GPP specification, a 3GPP2 specification, or an IEEE specification.

40. The apparatus of claim 38, wherein the processor module for establishing negotiates the air interface session between the AT and the target access system via the secure channel to facilitate handover of a communication session of the AT from the source access system to the target access system.

41. The apparatus of claim 38, wherein the transmitter for transmitting user traffic is configured to transmit user traffic via the secure channel.

42. The apparatus of claim 38, wherein the transmitter for transmitting user traffic is configured to transmit user traffic via the negotiated air interface.

43. An apparatus for session handoff between a source access system and a target access system comprising:
means for communicating, by the target access system, with an access terminal (AT) via the source access system over a tunneled secure channel, the secure channel configured for negotiating an air interface session between the AT and the target access system;
means for transmitting, from the target access system to the AT, stored air interface session information for the air interface session between the AT and the target access system; and
means for establishing a connection with the AT over the negotiated air interface,
wherein the means for transmitting is configured to transmit user traffic to the AT.

44. The apparatus of claim 43, wherein the source access system or the target access system is operable based on at least one of a 3GPP specification, a 3GPP2 specification, or an IEEE specification.

45. The apparatus of claim 43, wherein the means for establishing comprises means for negotiating the air interface session between the AT and the target access system via the secure channel to facilitate handover of a communication session of the AT from the source access system to the target access system.

46. The apparatus of claim 43, wherein the means for transmitting is further configured to transmit user traffic via the secure channel.

47. The apparatus of claim 43, wherein the means for transmitting is further configured to transmit user traffic via the negotiated air interface.

48. A non-transitory computer-readable medium comprising sets of codes stored thereon, which, when executed by a processor, cause the processor to perform session handoff between a source access system and a target access system, the sets of codes comprising:
- a first set of codes for communicating, by the target access system, with an access terminal (AT) via the source access system over a tunneled secure channel, the secure channel configured for negotiating an air interface session between the AT and the target access system;
- a second set of codes for transmitting, from the target access system to the AT, stored air interface session information for the air interface session between the AT and the target access system;
- a third set of codes for establishing a connection with the AT over the negotiated air interface; and
- a fourth set of codes for transmitting user traffic to the AT.

* * * * *